United States Patent [19]
Combs et al.

[11] 3,797,094
[45] Mar. 19, 1974

[54] ASSEMBLY TOOL
[76] Inventors: Cassius C. Combs, Rt. No. 2, Box 62; Arthur D. Hulet, Box 173, both of Wisconsin Dells, Wis. 53965
[22] Filed: Apr. 26, 1972
[21] Appl. No.: 247,777

[52] U.S. Cl. ................................ 29/237, 29/282
[51] Int. Cl. ...................... B23p 19/04, B21d 39/04
[58] Field of Search ............... 29/237, 282; 254/29

[56] References Cited
UNITED STATES PATENTS

| | | | |
|---|---|---|---|
| 3,364,555 | 1/1968 | Swink | 29/237 |
| 3,665,579 | 5/1972 | Jaeger et al. | 29/237 |
| 3,710,427 | 1/1973 | Doty | 29/237 |
| 3,096,572 | 7/1963 | Simmons | 29/237 |
| 3,688,378 | 9/1972 | Garvey | 29/237 |
| 3,571,896 | 3/1971 | Wilkerson | 29/237 |

Primary Examiner—James L. Jones, Jr.
Attorney, Agent, or Firm—Hill, Sherman, Meroni, Gross & Simpson

[57] ABSTRACT

A tool for joining transite and soil pipe which utilizes a neoprene gasket in which the female member has a flange and the male member is received into the flange and gasket comprising a bifurcated handle which fits behind the flange for joining and has an arm which is attachable to the male member so as to apply pressure to join the members together. The tool may also be used for separating pipes to force them apart in response to movement of the handle.

8 Claims, 5 Drawing Figures

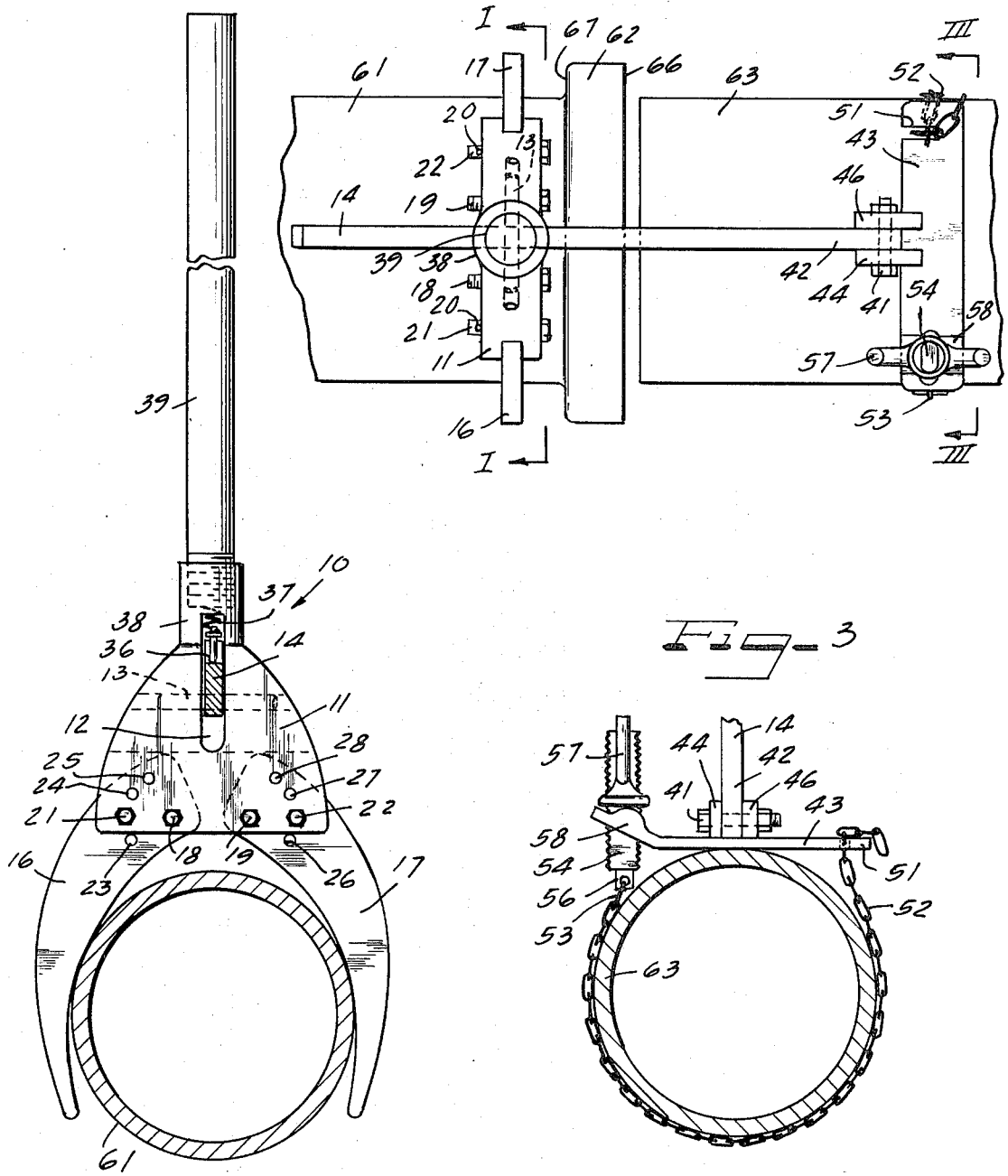

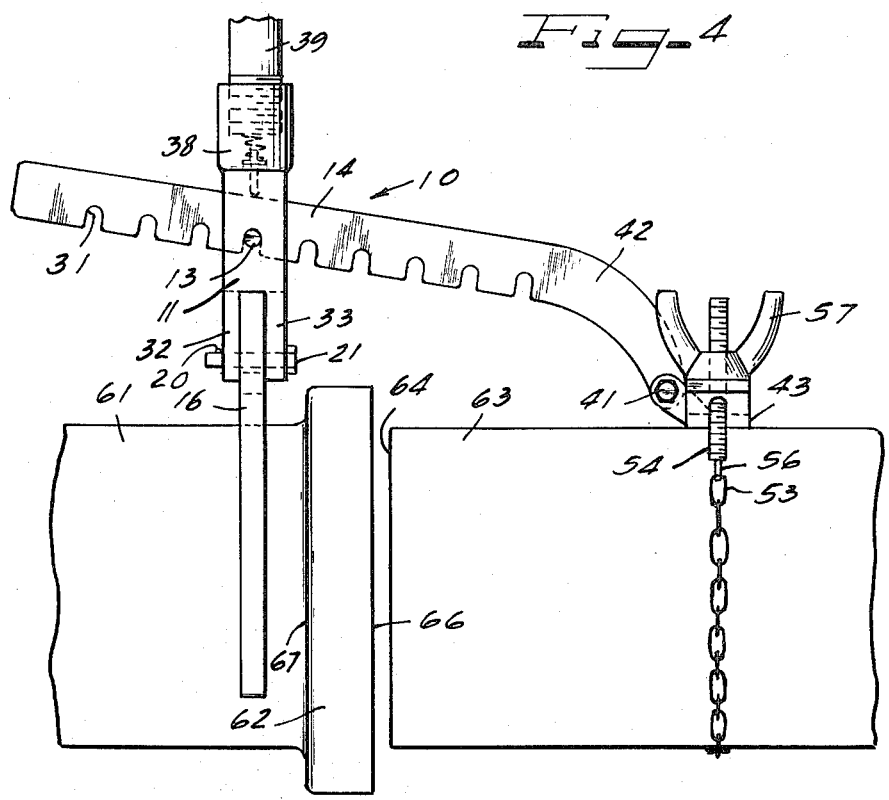
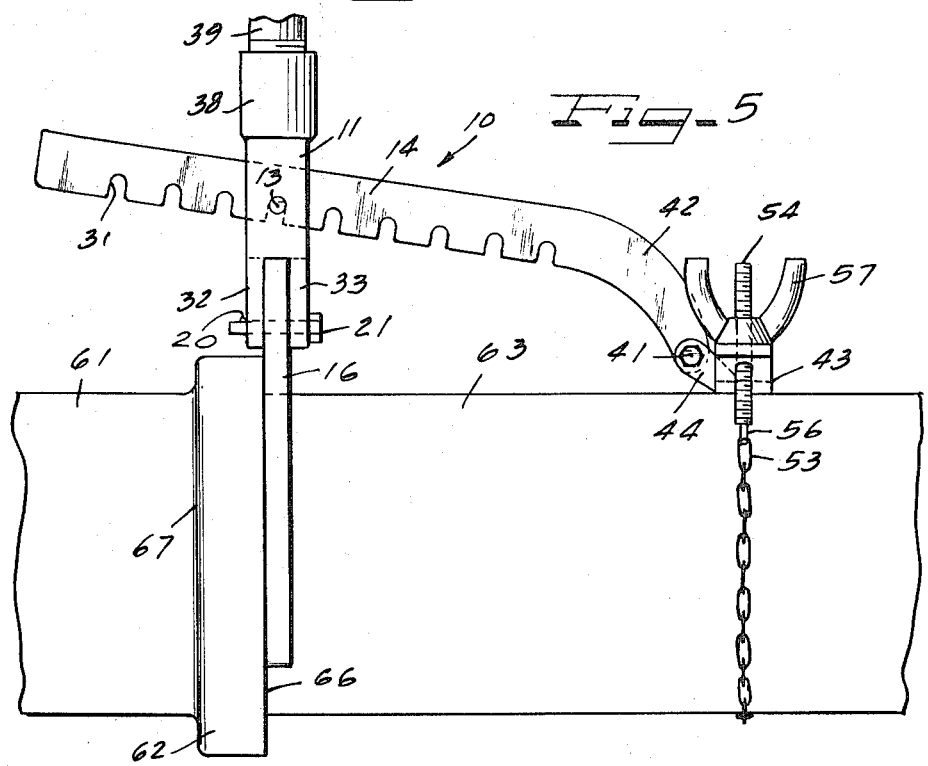

ASSEMBLY TOOL

BACKGROUND OF THE INVENTION

1. Field of the Invention

This invention relates in general to joining means and in particular to means for joining and dis-assembling transite and soil pipe.

2. Description of the Prior Art:

Gaskets have been developed which are placed into the flange of a female portion of a soil pipe and in which a mating pipe is forced by applying longitudinal pressure. It has been awkward and difficult to apply the longitudinal force so as to join the members together since in addition to straight sections of pipe, fittings, such as elbows, and Y's, must also be connected. It is also desirable to separate sections of pipe by pulling them apart.

SUMMARY OF THE INVENTION

The present invention comprises a bifurcated member with a handle which fits around a first section of pipe with the bifurcations resting behind the flange. The bifurcated portions are adjustable for handling different sizes of pipe. An arm is connected through the bifurcated handle and is formed with a plurality of notches that may be selectively engaged with a pin in the handle. A spring plunger holds the arm against the pin in the selected notch. The other end of the arm is connected to the second piece of pipe by a cross member pivotally attached to the end of the arm and including a chain which has a first end receivable in a slot in the cross arm and a second end which is attached to a threaded shaft which receives a thumb screw for tightening the chain about the second pipe. To join the two sections of pipe, the neoprene is placed inside the flange of the first pipe and the bifurcated handle is moved to pivot it against the flange thus causing the arm to pull the second piece of pipe into the neoprene gasket until it is seated.

To dis-assemble the pipes the bifurcated arm is moved so that it engages the flange of the first pipe on the side adjacent the second pipe and the handle is pivoted so as to force the second pipe from the first pipe.

Other objects, features and advantages of the invention will be readily apparent from the following description of certain preferred embodiments thereof taken in conjunction with the accompanying drawings although modifications and variations may be effected without departing from the spirit and scope of the novel concepts of the disclosure, and in which:

BRIEF DESCRIPTION OF THE DRAWINGS

FIG. 1 is a front plan view of the bifurcated handle of the invention;

FIG. 2 is a top plan view of the invention mounted on a pair of pipes;

FIG. 3 is a sectional view taken on line III—III of FIG. 2;

FIG. 4 is a side plan view of the invention for joining a pair of pipes; and

FIG. 5 is a side plan view illustrating the invention in position for disconnecting a pair of pipes.

DESCRIPTION OF THE PREFERRED EMBODIMENTS

The joining and dis-assembling tool of the present invention is designated generally as 10 and comprises a bifurcated handle portion shown in plan view in FIG. 1 which has a handle 39 receivable in a threaded portion 38 of a main body portion 11. A slot 12 is formed through the main body portion 11 and a pulling arm 14 extends therethrough. As best shown in FIGS. 4 and 5, the pulling arm 14 has a plurality of slots 31 formed on one edge thereof which are selectively engageable with a pin 13 which extends through the body portion 11 and the slot 12. A plunger 36 is spring-loaded by spring 37 so as to hold the arm 14 with the pin 13 in engagement with a slot 31. To move the arm 14 so that the pin 13 engages a different slot, the arm 14 is moved in the slot 12 against the plunger 36 which disengages the pin 13 from the slot 31 and another selected slot 31 may be fitted about the pin 13.

The lower portion relative to FIG. 1 of the main body portion 11 is formed with a slot at right angles to slot 12 and a pair of clamping fingers 16 and 17 are adjustably mounted therein. As shown in FIGS. 4 and 5, the clamping fingers 16 and 17 are pivotally attached to the member 11 by downwardly extending portions 32 and 33 and bolts 18, 19, 21 and 22. The bolts 18 and 19 serve as pivot pins for the clamping fingers 16 and 17 and pass through aligned openings in the fingers 16 and 17 and the portions 32 and 33, respectively. Adjustment pins 21 and 22 pass through aligned openings in portions 32 and 33 and mate with one of a plurality of openings 23–25 in finger 16 and openings 26–28 in finger 17. Thus, by removing the pins 21 and 22 the angular relationship between the fingers 16 and 17 may be decreased or increased as desired and the locking pins 21 and 22 reinserted so as to lock the fingers in the new selected positions.

The pins 18 and 19, 21 and 22 are threaded into one side of main body portion 32. Locking pins 21 and 22 have spring loaded balls 20 at one end.

One end of the arm 14 is designated as 42 and is bent downwardly toward a second pipe 63 and is pivotally attached by a pin 41 to a cross member 43 which has a mating bracket 44 or 46 for receiving the pivot pin 41 and the end 42 of arm 14. As best shown in FIGS. 2 and 3, the cross arm 43 is formed with a slot 51 for receiving one end of a chain 52. The chain 52 passes around the pipe 63 and has its second end 53 attached to an eyelet 56 in a threaded shaft 54. The threaded shaft 54 has flatted sides and passes through a slot formed in the cross member 43. A portion 58 engages a thumb screw 57 so as to prevent it from rotating relative to the cross bar 43.

In operation, to join a pair of pipes, the arms 16 and 17 are adjusted by placing the pins 21 and 22 into the proper holes of the arms 16 and 17 to adjust the distance between the arms 16 and 17 and the handle member is placed over the pipe as shown in FIGS. 1, 2 and 4 with the arms 16 and 17 behind the flange 62 of the first pipe. The arm 14 is adjusted so that it extends out toward the second pipe and the chain placed around the second pipe and tightened by thumb screw 57 until the cross bar 43 and the arm 14 are firmly attached to the second pipe 63. The pipe 63 then may be pulled into the flange 62 of pipe 61 by moving the handle 39 to the left relative to FIG. 4 such that the arms 16 and 17 engage the back side 67 of the flange 62 thus forcing the arm 14 to the left relative to FIG. 4 and consequently drawing the pipe 63 into the flange and the neoprene gasket which has been previously mounted in the flange 62. The pipe 63 is moved until it is firmly seated in the gasket and the tool may then be removed by loosening the thumb screw 57 so that the chain is loosened about the pipe 63 and the end of the chain 52 may be removed from the slot 51 so that the tool may be lifted from the joined pipes.

In order to dis-assemble a pair of pipes which have been previously joined, the bifurcated handle with the arms 16 and 17 is mounted as shown in FIG. 5 and the chain is attached by the thumb screw 57 about the second pipe 63 as shown in FIG. 5. The handle 39 may be moved to the right relative to FIG. 5 such that the arms 16 and 17 pivot against the face 56 of flange 62, thus, moving the arm 14 to the right relative to FIG. 5, forcing the pipes 61 and 63 apart to disassemble them.

It is seen that this invention allows for rapid assembling and dis-assembling of pipes. It is to be realized, of course, that various shaped fittings such as elbows and Y's may also be connected and disconnected with the invention and its use is not limited to straight pipe sections.

Although the invention has been described with respect to certain preferred embodiments thereof it is not to be so limited as changes and modifications may be made therein which are within the full intent and scope as defined by the appended claims.

We claim:

1. A tool for connecting and disconnecting pipe with one pipe having a flange on one end into which an end of another pipe fits comprising: a bifurcated member with a handle receivable over one pipe against said flange and formed with a slot which extends longitudinally of said one pipe; a pulling arm receivable through said slot; a cross member at one end of said pulling arm; a chain forming a loop from the opposite ends of said cross member to lock said cross member to said another pipe, a pin extending through said longitudinal slot, and wherein said pulling arm is formed with a plurality of notches selectively engageable with said pin to adjust the length of said pulling arm relative to said bifurcated member.

2. A tool according to claim 1 comprising a spring loaded plunger mounted in said bifurcated member and extending into said slot and engageable with said holding arm to hold said pin in one of said notches.

3. A tool according to claim 1 wherein said bifurcated member comprises a main body portion to which said handle is attached and a pair of curved flange-engaging arms pivotally attached to said main body portion and a pair of locking pins receivable through a plurality of openings in said main body portion and said engaging arms to lock said arms relative to said main body portion in selected angular positions.

4. A tool according to claim 3 wherein said flange-engaging arms are curved.

5. A tool according to claim 1 wherein said cross member is pivotally attached to said one end of said pulling arm and is formed with a slot at one end into which said chain may be placed.

6. A tool according to claim 5 wherein a flat sided opening is formed adjacent the second end of said cross member, a flat sided threaded shaft attached to said chain and extending through said flat sided opening and a locking nut threaded on said flat sided shaft.

7. A tool according to claim 6 wherein said locking nut is a thumbscrew.

8. A tool according to claim 7 comprising a depression formed in said cross member adjacent said flat sided opening to receive said thumbscrew therein.

* * * * *